United States Patent [19]

Wakabayashi et al.

[11] Patent Number: 5,048,635
[45] Date of Patent: Sep. 17, 1991

[54] ELECTRICALLY ACTUATED FREE WHEEL HUB APPARATUS

[75] Inventors: Hideaki Wakabayashi, Nagoya; Masumi Kazaoka, Ama; Tooru Kagata, Toyota, all of Japan

[73] Assignee: Aisin Seiki Kabushiki Kaisha, Kariya, Japan

[21] Appl. No.: 589,534

[22] Filed: Sep. 28, 1990

[30] Foreign Application Priority Data

Sep. 29, 1989 [JP] Japan .................................. 1-115061

[51] Int. Cl.$^5$ ..................... B60K 17/354; B60K 23/08
[52] U.S. Cl. ...................................... 180/247; 192/50; 192/40
[58] Field of Search ............... 180/247, 244, 233, 197; 192/50, 40, 35; 364/424.05

[56] References Cited

U.S. PATENT DOCUMENTS

| | | | |
|---|---|---|---|
| 4,694,943 | 9/1987 | Petrak | 192/40 X |
| 4,776,441 | 10/1988 | Kagata et al. | 192/50 X |
| 4,928,804 | 5/1990 | Wakabayashi | 180/247 |
| 4,991,680 | 2/1991 | Shiba et al. | 180/247 X |

Primary Examiner—Charles A. Marmor
Assistant Examiner—Kevin Hurley
Attorney, Agent, or Firm—Burns, Doane, Swecker & Mathis

[57] ABSTRACT

An electrically actuated free wheel hub apparatus includes an axle tube, a wheel hub arranged about the axle tube and operated in response to the position of a drive transfer mechanism. An electric motor is disposed in a body fixed to the wheel hub and an axle shaft is interior to the axle tube. A control device control transmittal of power between the axle shaft and the wheel hub by a clutch mechanism. A syncromesh device is provided in the drive transfer mechanism so that each rotation of a front wheel side and a rear wheel side can be synchronized and a delay device transmit current to the motor after the completion of synchronizing.

1 Claim, 3 Drawing Sheets

ELECTRICALLY ACTUATED FREE WHEEL HUB APPARATUS

BACKGROUND OF THE INVENTION

1. Field of the Invention

This invention relates to an electrically actuated free wheel hub apparatus provided between an axle shaft and a wheel hub of the vehicle so as to intermittently deliver power to the wheel hub of the vehicle.

2. Description of the Related Art

A free wheel hub apparatus provided with an electric motor is known. The apparatus is constructed with an axle tube, a wheel hub rotatably arranged about the axle tube, a body snugly fixed to the wheel hub, an electric motor assembled in the body, and a clutch mechanism disposed in the body. Delivery of power between an axle shaft in the axle tube and the wheel hub is controlled by means of the clutch mechanism. A slip ring, mounted on the axle tube, is elastically contacted by a brush rotatable with the body to supply the current to the motor.

When the apparatus is changed over to permit four wheel drive from two wheel drive, a selector lever moveable between selectable positions indicative of two wheel and four wheel drive is provided adjacent the driver's seat. Then, an exclusive switch of the electrically actuated free wheel hub apparatus is operated, so that delivery of power is made possible by transferring the power through the clutch mechanism so as to shift to four wheel drive.

However, if the above described operation is performed while the vehicle is moving and since rotation between front wheels and rear wheels is not equal, it is possible to not change into four wheel drive from two wheel drive. Accordingly, the above-discussed arrangement was inconvenient as the apparatus could only be positively changed into two wheel drive from four wheel drive only when the vehicle was stopped.

SUMMARY OF THE PRESENT INVENTION

It is an object of the present invention to provide an improved electrically actuated wheel hub which can be positively shifted into four wheel drive from two wheel drive even if the vehicle is moving.

BRIEF DESCRIPTION OF THE DRAWINGS

These and other objects, features and advantages of the present invention will become fully apparent on reading the following detailed description with reference to the accompanying drawings, wherein like members bear like reference numerals, and wherein.

DETAILED DESCRIPTION OF A PREFERRED EMBODIMENT OF THE INVENTION

Figure 1:
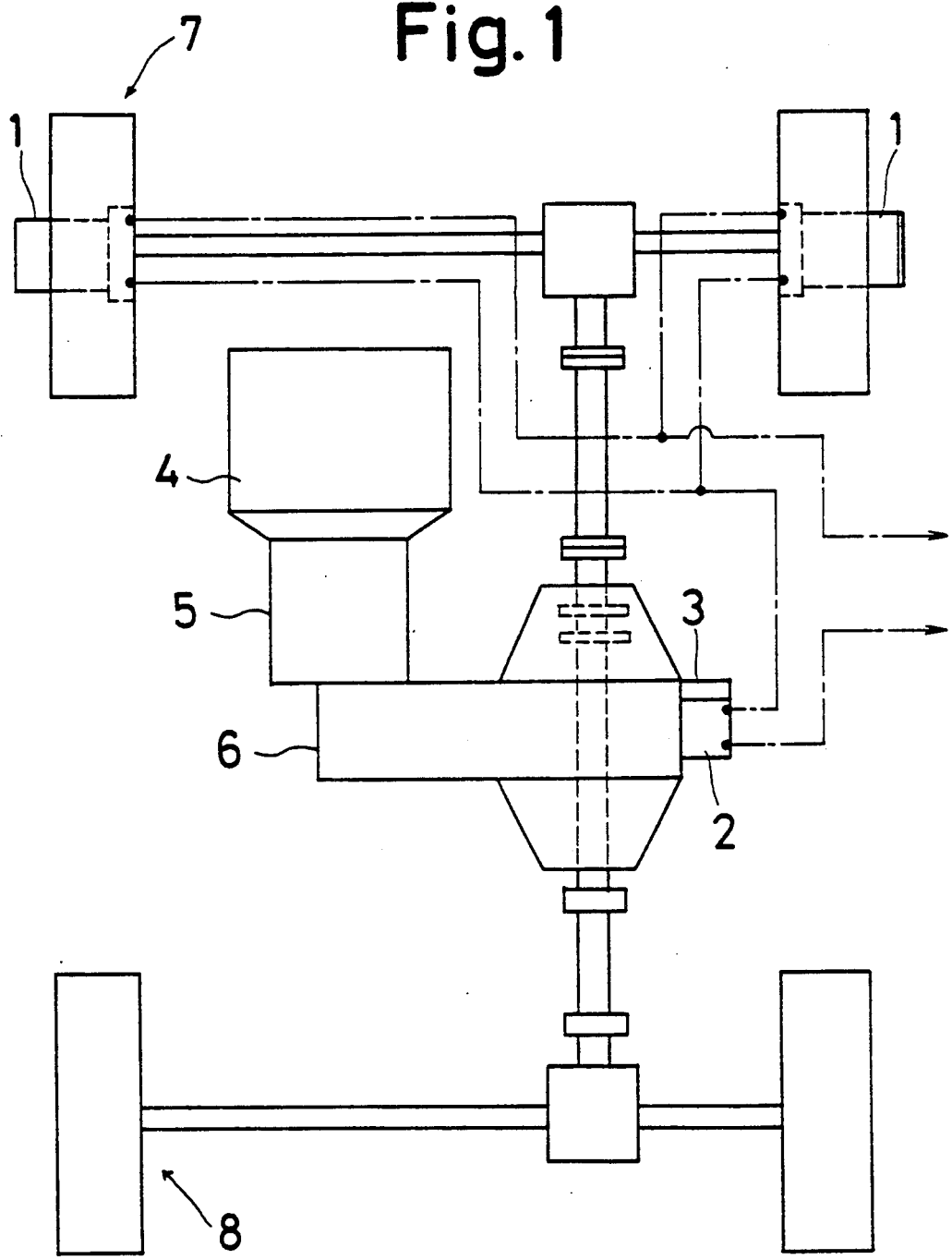
FIG. 1 is a schematic illustration of an electrically actuated free wheel hub apparatus illustrate an embodiment of the present invention.
Figure 2:
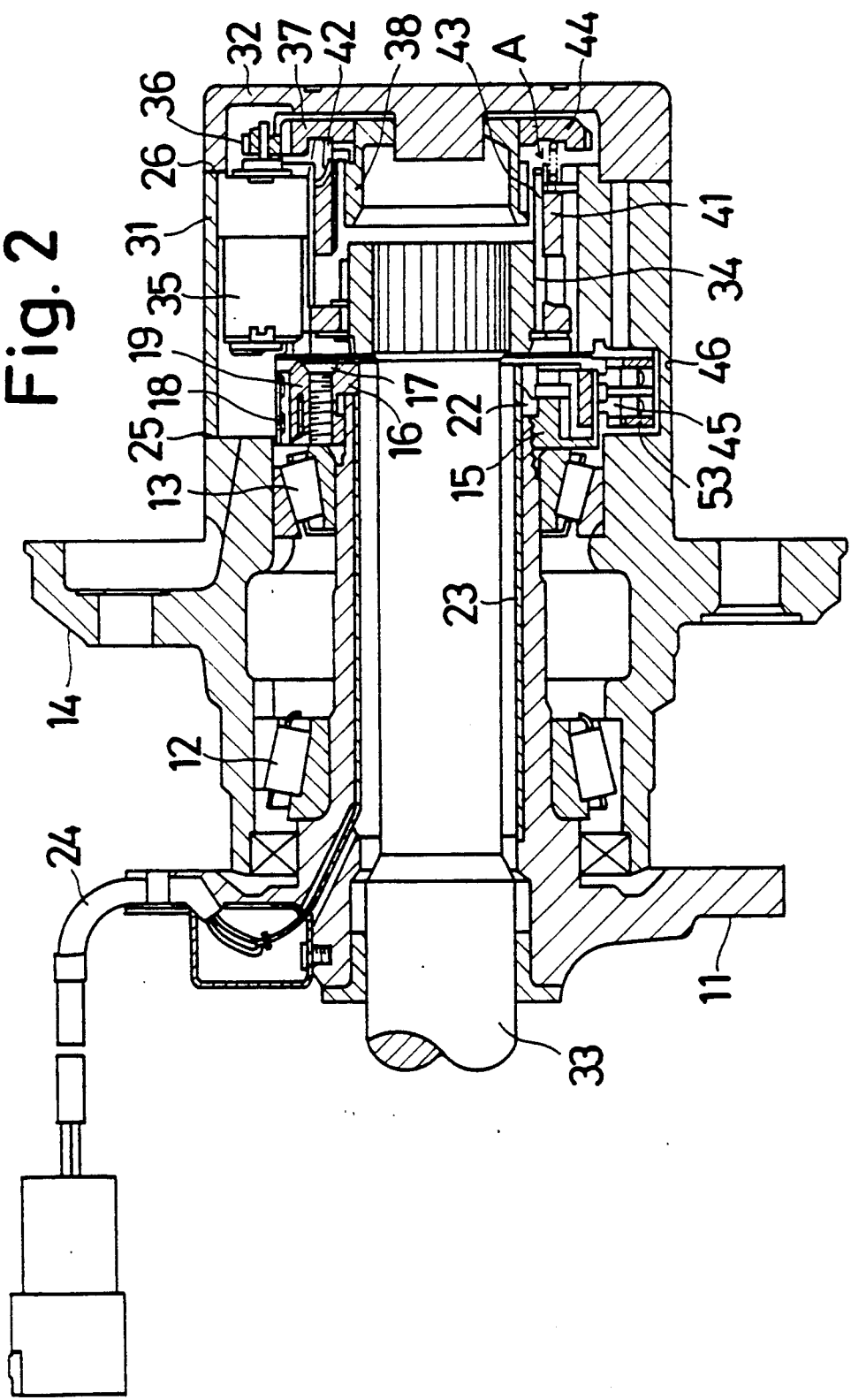
FIG. 2 is a sectional view of an operation member of an electrically actuated free wheel hub apparatus shown in FIG. 1.

Referring to FIG. 1, there is illustrated an electrically actuated free wheel hub apparatus according to an embodiment of the present invention. An operation member 1 is assembled to a front wheel of a four wheel drive vehicle. The operation member 1, as shown in FIG. 2, is provided with a cylindrical shaped axle tube 11, a wheel hub 14 rotatably arranged about the axle tube 11 through bearings 12,13. A locknut 15 and an annular holder 16 integrally connected by a screw 17 is positioned at one end of the bearing 13. The lock-nut 15 is spline connected with an outer portion of the axle tube 11 and adjustably preloaded.

The holder 16 is circumferentially located at an outer end of the axle tube 11 and secured to the locknut 15 by the screw 17, so that the holder 16 is not rotatable against the axle tube 11. A pair of slip rings 18,19 are integrally fixed to the outer periphery of the holder 16 through an insulating resin member. The slip rings 18, 19 are connected with a lead line 24 through a flexible printed base 23 which is disposed in the axle tube 11 and with a respective contacting point 22 of a spring arrangement. The lead line 24 is in connection with an electrical source (not shown). A control box is electrically connected to an electric motor, described later, and a shift lever 3 is provided adjacent the driver's seat so as to be moveable between two wheel drive position (H2) or a four wheel drive position (H4, L4) which has two ranges of gear ratio operation.

A body 31, the wheel hub 14 and a cover 32 are connected together through a plurality of gaskets 25, 26 and a bolt (not shown). The body 31 is cylindrical shaped. An inner clutch element 34, fixed to the axle shaft 33, is rotatable and axially fixed and an electric motor 35 is assembled in the body 31 together with the clutch 34. The electric motor 35 can be rotated in one direction (positive direction) and an opposite direction (negative direction) and is connected to a cam rotor 38 through gears 36, 37 so that the cam rotor can be rotated. A clutch mechanism is constructed with the cam rotor 38, an outer clutch element 41, fixed to the body 31, a cam follower 42 disposed between the outer clutch element 41 and the cam rotor 38, a pair of springs 43, 44 and the inner clutch element 34. The above-mentioned clutch mechanism is known. If the electric motor 35 is rotated in the positive direction, the outer clutch element 41 is moved toward the left in FIG. 2, so that the inner clutch element 34 and the body 31 are rotatably connected. If the electric motor 35 is rotated in the negative direction, the outer clutch element 41 is moved toward the right in FIG. 2. As a result, the inner clutch element 34 and the body 31 rotate with respect to one another. Plural brushes 45, 46 are elastically attached to the outer periphery of the slip rings 18, 19 are assembled in a case 53 which is fixed to the body 31 by a screw.

In FIG. 1, a syncromesh device is provided with a drive transfer 6 at the back side of an engine 4 and a transmission 5 so as power from the transmission 5 to the front and rear wheels 7, 8. The syncromesh device synchronizes each rotation of the front wheel 7 and the rear wheel 8 in response to the operation of the lever 3.

Figure 3:
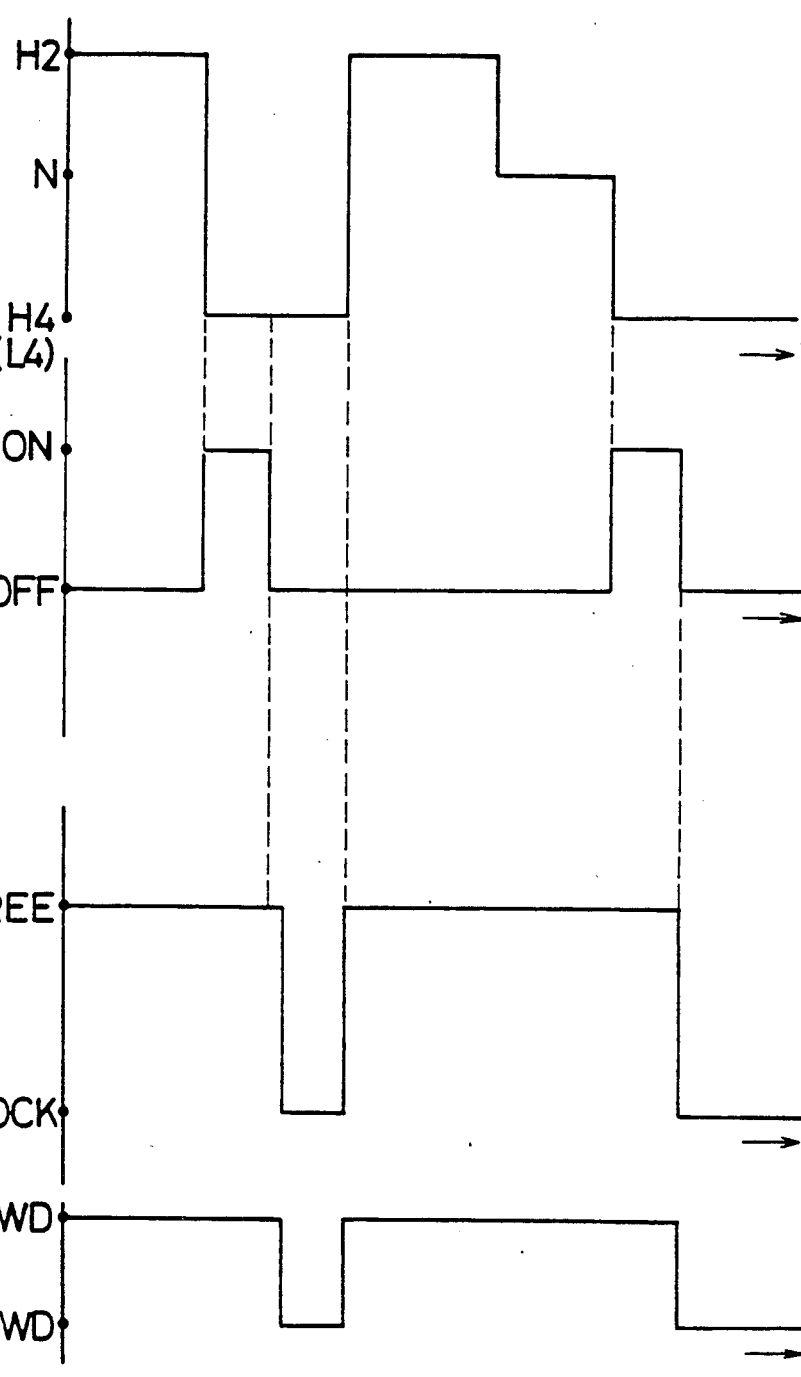
FIG. 3 is a diagram of operating conditions of the electrically actuated free wheel hub apparatus as a function of time.

The above-mentioned operation of the preferred embodiment is described according to FIG. 3 hereinafter. FIG. 3 is a diagram of operation conditions of the electrically actuated free wheel hub apparatus as a function of time. Wherein, a position of the transfer is shown in (A), the ON-OFF condition of the syncromesh device is shown in (B), the Free or Lock condition of the operation member is shown in (C) and the two or four wheel drive condition of the vehicle is shown in (D).

In case that the position of the drive transfer mechanism 6 is changed into H4 from H2 by the lever 3, the syncromesh device disposed in the drive transfer mechanism 6 synchronizes each rotation of the front wheel side 7 and the rear wheel side 8. After the synchronizing is finished, the electric motor 35 receives the vehicle operating conditions, as shown in FIG. 3, from the CPU 2, whereby the axle tube 11 and the wheel hub 14 deliver power through the clutch mechanism A. Thus, irrespective of stop or traveling conditions of the vehicle two or four wheel drive can be positively engaged. A delay circuit is provided in conjunction with the CPU 2 so as to transmit operating power to the electric motor only upon completion of the synchronizing operation for the front and rear wheel.

The principles, preferred embodiments and modes of operation of the present invention have been described in the foregoing application. The invention which is intended to be protected herein should not, however, be construed as limited to the particular forms disclosed, as these are to be regarded as illustrative rather than restrictive. Variations and changes may be made by those skilled in the art without departing from the spirit of the present invention. Accordingly, the foregoing detailed description should be considered exemplary in nature and not limited to the scope and spirit of the invention as set forth in the appended claims.

What is claimed is:

1. An electrically actuated free wheel hub apparatus for a vehicle comprising:
   an axle tube;
   a wheel hub rotatably arranged about said axle tube and operated in response to a position of a device transfer mechanism;
   an electric motor disposed in a body fixed to said wheel hub;
   an axle shaft disposed in said axle tube;
   control means for transmitting power between said axle shaft and said wheel hub;
   a clutch mechanism operable to connect said axle shaft and said wheel hub in response to said control means;
   electrical supply means for supplying electrical power to said electric motor through a slip ring mounted on said axle tube and a brush elastically contacting the external circumference of said slip ring;
   syncromesh means provided in said drive transfer mechanism for synchronizing each rotation of a front wheel side drive shafts and a rear wheel side drive shaft of the vehicle; and
   delay means provided in said control means for delaying a supply of current to said electric motor subsequent to completion of said synchronizing.

* * * * *